Patented June 3, 1952

2,598,661

UNITED STATES PATENT OFFICE 2,598,661

MONOAZO DYESTUFFS

Harry W. Grimmel, Providence, R. I., Ludwig Richter, Easton, Pa., and Jack F. Morgan, Delmar, N. Y., assignors to General Aniline & Film Corporation, New York, N. Y., a corporation of Delaware No Drawing. Application June 8, 1950, Serial No. 166,986

1 Claim. (Cl. 260—199)

The present invention relates to monoazo dyestuffs containing an N-phthaloyl-amino-hydroxynaphthalene group, said dyestuffs being capable of being converted into their metal complex compounds, in which form they yield valuable dyeings of excellent fastness properties.

It has been proposed to produce monoazo dyestuffs capable of being converted into their metal complex compounds and containing an N-phthaloyl - amino - hydroxynaphthalene group. The dyeings obtained with these dyes are characterized as being of excellent fastness to milling. The prior art required that the dyes be produced by the reaction of a diazotized o-aminophenol free from sulfonic acid groups with the aforestated N-phthaloyl-amino-hydroxy-naphthalene. It has been discovered, however, that the manufacture of these dyes proceeds only with great difficulty and always with marked decomposition. As a consequence, the yields are low and the resulting dyes are quite expensive. Furthermore, the dyeings produced from such dyes have the disadvantage that they change their shade when viewed under artificial light.

Surprisingly, we have found that all of the difficulties encountered in the preparation of the prior art products and in the dyeings obtained therewith can be avoided if there be used for the preparation of the dyes the diazonium compound from 4-chloro-2-amino-1-hydroxybenzene-6-sulfonic acid, on the one hand, and 1-N-phthaloylamino-7-hydroxy-naphthalene, on the other hand. Thus the formation of the dye is surprisingly energetic. The formation of by-products is avoided and as a consequence the yields are materially higher. The final cost price of the dyestuff is also much lower. Furthermore, the dyeings obtained from the metal complexes of such dye are not only extremely fast to light and fulling, but have the extremely important property of retaining their shade when viewed under artificial light. They furthermore have the great advantage that they dye wool according to the monochrome process in full and pleasing shades of outstanding fastness properties, the shades of such dyeings likewise being unaffected when scanned under artificial light.

Such dye and the metal complexes thereof constitute the purposes and objects of the present invention.

The dyestuffs, the metal complex compounds of which yield the aforesaid valuable dyeings may be characterized by the following general formula:

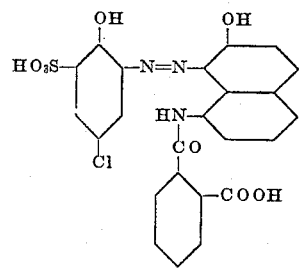

The monoazo dyestuff may be metallized on the fiber or in substance according to the customary manner. The usual metallizing agents such as those of cobalt, chromium, aluminum, nickel and the like may be employed. The monoazo dye is made in the usual manner by diazotizing the amine with sodium nitrite and hydrochloric acid and coupling the resulting diazonium chloride in an alkaline solution. The alkali salts of the dye, when in the dry pulverized form, are generally dark powders soluble in water dyeing wool from an acid bath gray to violet even shades.

The following example serves to further illustrate the invention but it is to be understood that the invention is not restricted thereto. The parts are by weight unless otherwise stated.

Example 22.4 parts of 4-chloro-2-amino-1-hydroxybenzene - 6 - sulfonic acid are diazotized and coupled with 33 parts of 1-N-phthaloylamino-7-hydroxy-naphthalene in soda-alkaline solution at pH of 10.5. The coupling proceeds slowly but is finished overnight. When the combination is complete, the dyestuff formed of the formula:

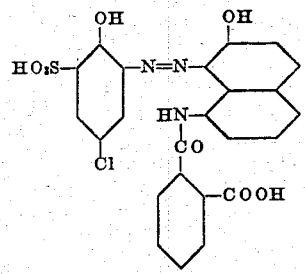

is salted out if desired after acidification, filtered off and dried. It is a dark powder, soluble in water and dyes wool from an acid bath a violet shade. When after-treated with chromium salts according to the usual methods, a bluish black shade is obtained of very good fastness to fulling, potting, and light.

The dyestuff, when applied according to the monochrome dyeing method, yields on wool bluish grey even shades of excellent fastness to light and fulling. The diazos obtained with such metallized salts do not change their shade in artificial light.

Various modifications of the invention will be apparent to those skilled in the art, and we accordingly do not intend to be limited in the patent granted except as necessitated by the appended claim.

This application is a division of our application Serial No. 655,904, filed March 20, 1946, entitled "Monoazo Dyestuffs," now abandoned.

We claim:
The monoazo dye of the formula:

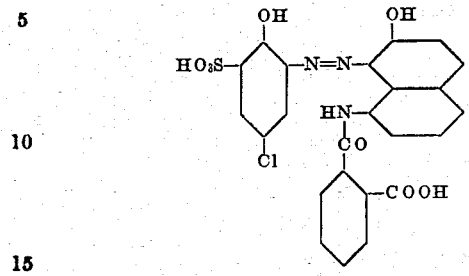

HARRY W. GRIMMEL.
LUDWIG RICHTER.
JACK F. MORGAN.

REFERENCES CITED

The following references are of record in the file of this patent:

UNITED STATES PATENTS

| Number | Name | Date |
|---|---|---|
| 1,078,925 | Kahn et al. | Nov. 18, 1913 |
| 1,411,245 | Geldermann et al. | Mar. 28, 1922 |
| 1,925,434 | Clingestein et al. | Sept. 5, 1933 |

FOREIGN PATENTS

| Number | Country | Date |
|---|---|---|
| 316,268 | Great Britain | Oct. 27, 1930 |